(12) United States Patent
Szeto et al.

(10) Patent No.: US 10,410,089 B2
(45) Date of Patent: Sep. 10, 2019

(54) TRAINING ASSISTANCE USING SYNTHETIC IMAGES

(71) Applicant: SEIKO EPSON CORPORATION, Tokyo (JP)

(72) Inventors: Hiu Lok Szeto, Richmond Hill (CA); Syed Alimul Huda, Scarborough (CA)

(73) Assignee: SEIKO EPSON CORPORATION, Tokyo (JP)

( * ) Notice: Subject to any disclaimer, the term of this patent is extended or adjusted under 35 U.S.C. 154(b) by 2 days.

(21) Appl. No.: 15/875,579

(22) Filed: Jan. 19, 2018

(65) Prior Publication Data

US 2019/0228263 A1 Jul. 25, 2019

(51) Int. Cl.
*G06K 9/62* (2006.01)
*G02B 27/01* (2006.01)
*G06T 19/00* (2011.01)
*G06K 9/00* (2006.01)

(52) U.S. Cl.
CPC ......... *G06K 9/6256* (2013.01); *G02B 27/017* (2013.01); *G06K 9/00671* (2013.01); *G06T 19/006* (2013.01)

(58) Field of Classification Search
CPC ............. G06K 9/6256; G06K 9/00671; G02B 27/017; G06T 19/006; G06F 3/005; G06F 3/011
See application file for complete search history.

(56) References Cited

U.S. PATENT DOCUMENTS

| | | | |
|---|---|---|---|
| 7,889,193 B2 | 2/2011 | Platonov et al. | |
| 8,780,110 B2 | 7/2014 | Ben Himane et al. | |
| 9,111,347 B2 | 8/2015 | Ben Himane | |
| 9,875,427 B2 | 1/2018 | Medasani et al. | |
| 2011/0002531 A1* | 1/2011 | Heisele | G06K 9/00208 382/154 |
| 2012/0120199 A1 | 5/2012 | Ben Himane | |
| 2012/0314096 A1* | 12/2012 | Kruglick | G06T 19/006 348/222.1 |
| 2013/0051626 A1 | 2/2013 | Abadpour et al. | |
| 2013/0218530 A1 | 8/2013 | Deichmann et al. | |

(Continued)

FOREIGN PATENT DOCUMENTS

| | | |
|---|---|---|
| JP | 2011-129082 A | 6/2011 |
| JP | 2013-050947 A | 3/2013 |

OTHER PUBLICATIONS

Oct. 19, 2018 Office Action issued in U.S. Appl. No. 15/451,752.

(Continued)

*Primary Examiner* — Stephen G Sherman
(74) *Attorney, Agent, or Firm* — Oliff PLC

(57) ABSTRACT

A method of detecting an object in a real scene using a computer includes specifying a 3D model corresponding to the object. The method further includes acquiring, from a capture camera, an image frame of a reference object captured from a first view angle. The method further includes generating a 2D synthetic image by rendering the 3D model in a second view angle that is different from the first view angle. The method further includes generating training data using (i) the image frame, (ii) the 2D synthetic image, (iii) the run-time camera parameter, and (iv) the capture camera parameter. The method further includes storing the generated training data in one or more memories.

22 Claims, 13 Drawing Sheets

(56) References Cited

U.S. PATENT DOCUMENTS

2017/0053447 A1* 2/2017 Chen .................. G06T 19/006
2017/0214899 A1* 7/2017 Meier ................. G06T 19/006

OTHER PUBLICATIONS

Konishi et al; "Fast 6D Object Pose Estimation from a Monolcular Image using Hierarchical Pose Trees;" OMRON Corportaion; 2016; 1 page.
Peng; "Combine color and shape in real-time detection of textureless objects;" Computer Vision and Image Understanding; vol. 135; 2015; pp. 31-48.
U.S. Appl. No. 15/839,247, filed Dec. 12, 2017 in the name of Moravec et al.
U.S. Appl. No. 15/451,752, filed Mar. 7, 2017 in the name of Lam et al.
U.S. Appl. No. 16/123,372, filed Sep. 6, 2018 in the name of Brusnitsyn.
U.S. Appl. No. 15/949,728, filed Apr. 10, 2018 in the name of Mukherjee et al.
U.S. Appl. No. 15/951,840, filed Apr. 12, 2018 in the name of Ahmed et al.
Apr. 15, 2019 Office Action issued in U.S. Appl. No. 15/451,752.
Jaramillo et al. "6-DoF Pose Localization in 3D Point-Cloud Dense Maps Using a Monocular Camera." Proceedings of ROBIO 2013—IEEE International Conference on Robotics and Biomimetics, Institute of Electrical and Electronics Engineers, Dec. 2013, pp. 1747-1752.

* cited by examiner

TRAINING ASSISTANCE USING SYNTHETIC IMAGES

BACKGROUND

1. Technical Field

This disclosure relates to a computer program causing a computer capable of communicating with an image processing system to realize image processing.

2. Related Art

Computer vision is technology that enables computers to obtain useful information from videos or images. Computer vision has useful applications in many fields, including augmented reality (AR), drone technology, surveillance, security authentication, and many others.

In many such applications, it is important for the computer to be able to identify, locate, and track objects within image frames. One way to do this is to establish sparse point correspondences between features on a 3D model and features in the image and solve the Perspective-n-Point (PnP) problem. These correspondences are typically established by detecting stable keypoints and matching them using distinctive appearance-based descriptors, such as Oriented FAST (using the Features from Accelerated Segment Test algorithm) and Rotated BRIEF (ORB) descriptors.

Keypoints generally are areas (patches of pixels) of unusual contrast or that are otherwise distinctive. Once keypoints for an object are known by the computer, the computer can identify that object in an image by locating these keypoints. However, in order to do this, keypoints for the object of interest should first be collected (usually from another image of the object). For this, the texture of the object (i.e. the real-life surface features of the object) should be learned by the computer in advance.

SUMMARY

This information can be obtained by gathering real images of the object in advance from angles that the object is expected to be viewed. Real images are preferable because they capture effects like camera noise and aspects of object texture that are not present in CAD (computer-aided design) models of the object. However, collecting real images from a broad range of views at high angular resolution can be very difficult for the user, as dozens of pictures would normally be obtained from angles throughout a hemispherical range. Moreover, the user may only be prompted to generally capture view angle areas, and may not collect sufficient images at each view angle. Collecting these images of the object is time consuming and some of the angles are particularly difficult to collect images from.

In view of the above, exemplary embodiments of the broad inventive concepts described herein provide a non-transitory computer readable medium that embodies instructions that cause one or more processors to perform a method. The method includes specifying a 3D model, stored in one or more memories, corresponding to an object. The method further includes setting a run-time camera parameter for a run-time camera that is to be used in detecting a pose of the object in a real scene. The method further includes setting a capture camera parameter for a capture camera that is to be used in capturing an image frame containing a reference object. The method further includes acquiring, from the capture camera, the image frame of the reference object captured from a first view angle. The method further includes generating a 2D synthetic image with any camera parameter by rendering the 3D model in a second view angle that is different from the first view angle. The method further includes generating training data using (i) the image frame, (ii) the 2D synthetic image, (iii) the run-time camera parameter, and (iv) the capture camera parameter. The method further includes storing the generated training data in one or more memories. In some embodiments, the method may further include detecting the object within the real scene using (i) the generated training data and (ii) images acquired by the run-time camera.

In some embodiments, setting the run-time camera parameter includes receiving, through a data communication port, information representing an Augmented-Reality (AR) device having the run-time camera, and acquiring, from one or more memories, the run-time camera parameter corresponding to the AR device in response to the information, a plurality of the run-time camera parameters and corresponding AR devices being associated with each other in one or more memories. In some embodiments, setting the run-time camera parameter includes acquiring, through a data communication port, the run-time camera parameter from an Augmented-Reality (AR) device having the run-time camera in the case where the AR device becomes accessible by the one or more processors. In some embodiments, the AR device is a head-mounted display device having the run-time camera. In some embodiments, one camera functions as the run-time camera and the capture camera. In some embodiments, the capture camera is a component of a smartphone or tablet. In some embodiments, the one or more processors are a component of the smartphone or tablet. In some embodiments, the method further includes selecting data representing a first view range that includes the first view angle, prior acquiring the image frame.

Exemplary embodiments of the broad inventive concepts described herein further provide a head-mounted display. The head-mounted display includes: a camera that obtains an image of an object within a field of view; a memory; and a processor connected to the memory. The processor is configured to specify a 3D model, stored in one or more memories, corresponding to the object. The processor is further configured to set a camera parameter for the camera. The processor is further configured to acquire, from the camera, an image frame of a reference object captured from a first view angle. The processor is further configured to generate a 2D synthetic image with the camera parameter by rendering the 3D model in a second view angle that is different from the first view angle. The processor is further configured to generate training data using (i) the image frame, (ii) the 2D synthetic image, and (iii) the camera parameter. The processor is further configured to store the generated training data in the memory. In some embodiments, the processor is further configured to detect the object within the field of view using (i) the generated training data and (ii) images acquired from the camera.

In some embodiments, the processor is further configured to receive the 3D model through a communication port. In some embodiments, the head-mounted display further includes a display that displays artificial images to a user, and the processor is further configured to display a prompt to the user to capture the image frame of the reference object from the first view angle. In some embodiments, the processor is further configured to determine the first view angle based on a requirement for training data.

Exemplary embodiments of the broad inventive concepts described herein further provide a method of detecting an object in a real scene using a computer. The method includes specifying a 3D model, stored in one or more memories, corresponding to the object, using a processor. The method further includes setting a run-time camera parameter for a run-time camera that is to be used in detecting a pose of the object in the real scene, using the processor. The method further includes setting a capture camera parameter for a capture camera that is to be used in capturing an image frame containing a reference object, using the processor. The method further includes acquiring, from the capture camera, the image frame of the reference object captured from a first view angle, using the processor. The method further includes generating a 2D synthetic image with any camera parameter by rendering the 3D model in a second view angle that is different from the first view angle, using the processor. The method further includes generating training data using (i) the image frame, (ii) the 2D synthetic image, (iii) the run-time camera parameter, and (iv) the capture camera parameter, using the processor. The method further includes storing the generated training data in one or more memories, using the processor. The method further includes detecting the object within the real scene using (i) the generated training data and (ii) images acquired by the run-time camera, using the computer.

In some embodiments, the method further includes: receiving, through a data communication port, information representing an Augmented-Reality (AR) device having the run-time camera; and acquiring, from one or more memories, the run-time camera parameter corresponding to the AR device in response to the information, a plurality of the run-time camera parameters and corresponding AR devices being associated with each other in one or more memories. In some embodiments, setting the run-time camera parameter includes acquiring, through a data communication port, the run-time camera parameter from an Augmented-Reality (AR) device having the run-time camera in the case where the AR device becomes accessible by the processor. In some embodiments, the AR device is a head-mounted display device having the run-time camera. In some embodiments, one camera functions as the run-time camera and the capture camera. In some embodiments, the capture camera is a component of a smartphone or tablet. In some embodiments, the processor is a component of the smartphone or tablet. In some embodiments, the method further includes selecting data representing a first view range that includes the first view angle, prior to acquiring the image frame.

DETAILED DESCRIPTION OF EMBODIMENTS

Configuration of Image Processing System

Figure 1:
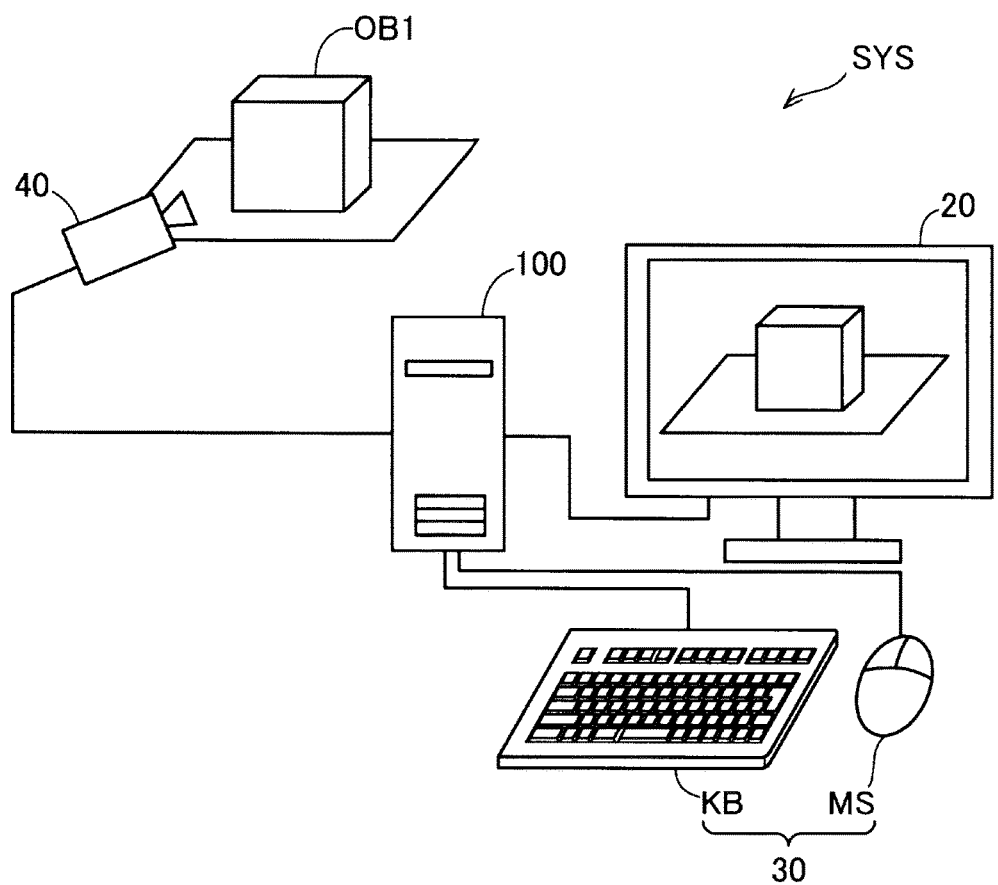
FIG. 1 is a schematic configuration diagram of an image processing system in the one embodiment.

FIG. 1 is a schematic configuration of an image processing system SYS in the present embodiment. The image processing system SYS images a target real object OB1, and creates new association data in which captured image data of the imaged real object OB1 is associated with data of a 3D model of the real object OB1, stored in advance.

Figure 14:
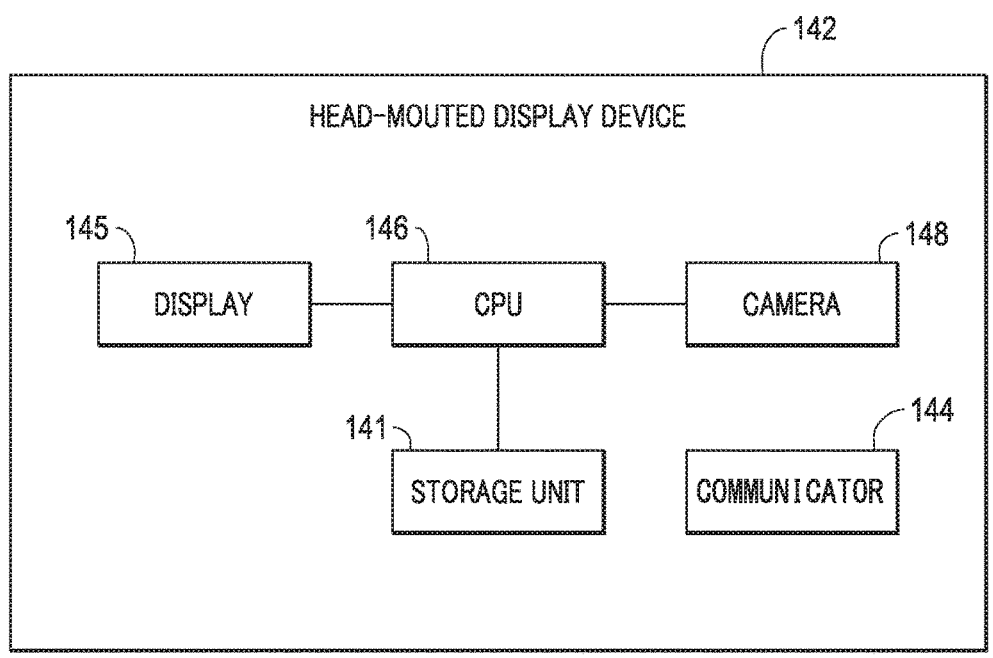
FIG. 14 is a diagram of a HMD (head-mounted display device) according to one embodiment.

The image processing system SYS includes a main body 100, an imager 40, a display section 20, and an operation section 30. The main body 100 is electrically connected to the display section 20, the operation section 30, and the imager 40. The main body 100 transmits control signals to the display section 20, the operation section 30, and the imager 40 so as to control the sections. The imager 40 of FIG. 1 is any camera or device with a camera which can capture video or images, according to embodiments, such as an HMD 142 (discussed related to FIG. 14 as a "run-time camera"), a handheld computing device (e.g., phone/tablet) with a camera (discussed later as a "capture camera"), etc. The imager 40 images external scenery based on the control signal transmitted from the main body 100. The real object OB1 corresponds to a real object in the appended claims. Details of control performed by the main body 100 will be described later.

The display section 20 is a display which can display an image. The display section 20 displays an image based on the control signal transmitted from the main body 100. In the example illustrated in FIG. 1, the display section 20 displays a captured image obtained by the imager 40.

The operation section 30 is a user interface for receiving a user's operation. As illustrated in FIG. 1, the operation section 30 includes a keyboard KW,KB and a mouse MS. The keyboard KW,KB has a plurality of buttons for judging the presence or absence of determination when being pressed. The keyboard KW,KB transmits a control signal corresponding to a pressed button to the main body 100. The mouse MS has two buttons for judging the presence or absence of determination when positions thereof are changed and when the buttons are pressed. The mouse MS transmits control signals corresponding to a positional change and the presence or absence of determination, to the main body 100. The operation section 30 may also include a touch-sensitive panel in some embodiments.

Figure 2:
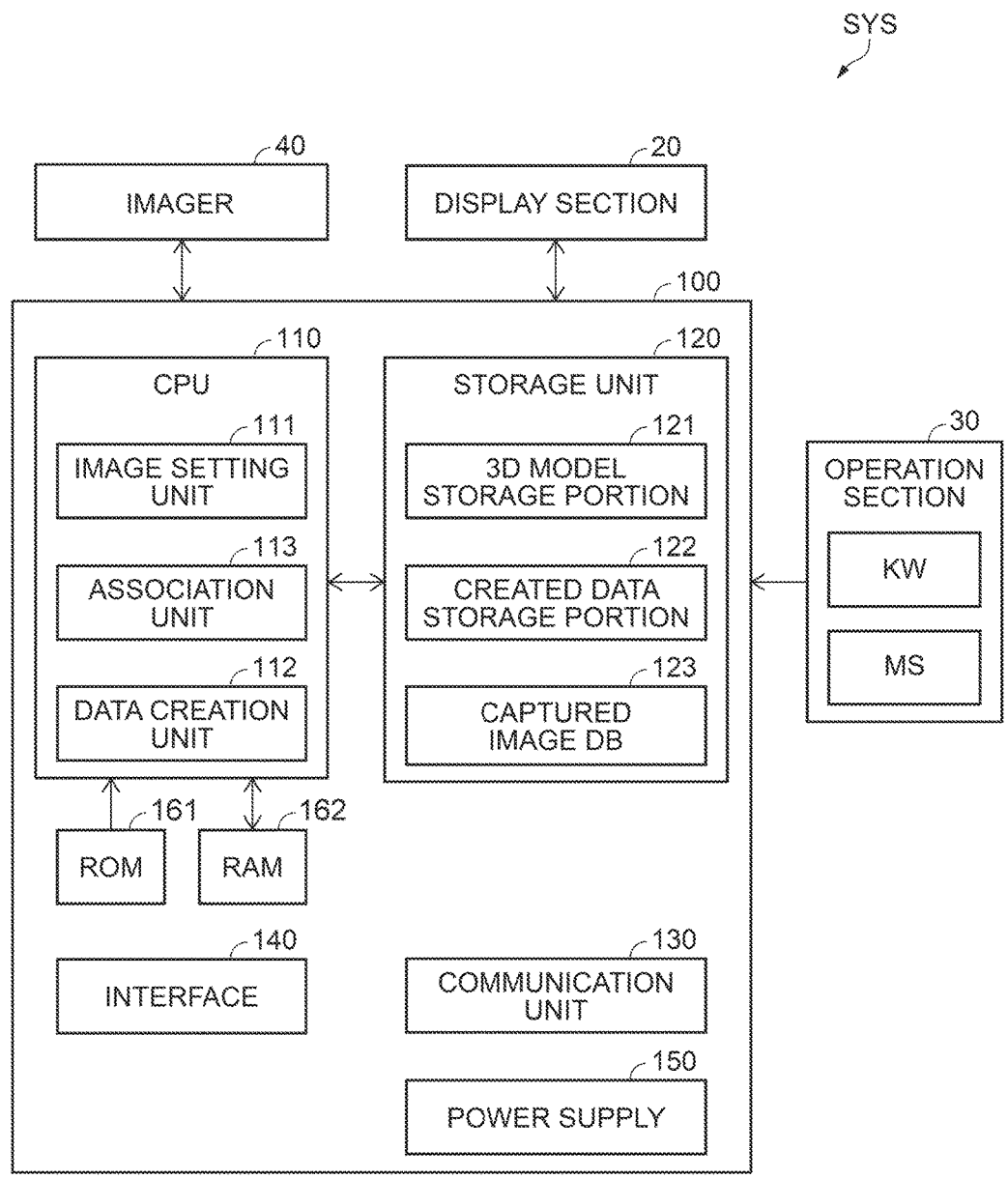
FIG. 2 is a block diagram illustrating a functional configuration of the image processing system.

FIG. 2 is a block diagram illustrating a functional configuration of the image processing system SYS. As illustrated in FIG. 2, the main body 100 includes a CPU 110, a storage unit 120, memory (e.g., ROM 161 and RAM 162), a communication unit 130, an interface 140, and a power supply 150. The storage unit 120 stores various items of data, and is constituted of a hard disk drive, solid state device, or the like. The storage unit 120 includes a 3D model storage portion 121, a created data storage portion 122, and a captured image database 123 (captured image DB 123).

The 3D model storage portion 121 stores a 3D model (3D CAD model) created by using computer-aided design (CAD) as a 3D model corresponding to a shape and a structure of the real object OB1. The created data storage portion 122 stores data created by the CPU 110. As details of data stored in the created data storage portion 122 will be described later, the created data storage portion 122 stores association data which is described later in detail. The captured image database 123 stores a captured image obtained by imaging the real object OB1 in the imager 40. The captured image stored in the captured image database 123 is one imaging frame of the real object OB1 imaged from a specific location, a moving image obtained by imaging the real object OB1, or the like.

The CPU 110 reads various programs from the ROM 161 and develops the programs in the RAM 162, so as to execute the various programs. The CPU 110 includes an image setting unit 111, a data creation unit 112, and an association unit 113. These units may be functions executed by software executing on the CPU 110. The image setting unit 111 sets an image displayed on the display section 20. For example, the image setting unit 111 displays an image of the real object OB1 captured by the imager 40, and a contour of a 2D model obtained based on the 3D model of the real object OB1 stored in the 3D model storage portion 121, on the display section 20. The data creation unit 112 creates association data in which (i) a spatial relationship (pose) and feature information (on feature locations and descriptors) obtained from the captured image of the real object OB1 in that spatial relationship are associated with each other, (ii) another spatial relationship and feature information obtained from the filler/synthetic image in that spatial relationship are associated with each other (step S23), and optionally (iii) 3D points on the 3D model represented in the 3D model frame of reference, the 3D points corresponding to the feature points. The data creation unit 112 stores the created association data in the created data storage portion 122. Details of data created by the data creation unit 112 will be described later.

The image setting unit 111 displays an image captured by the imager 40 on the display section 20. The image setting unit 111 displays a 2D model obtained by projecting a 3D model onto a virtual plane based on a predetermined viewpoint, on the display section 20. In a case where the real object OB1 is imaged by the imager 40, the association unit 113 associates a contour of the imaged real object OB1 with the contour of the 2D model at a timing of receiving a predetermined command from a user, so as to estimate a pose of the imaged real object OB1. Details of estimation of a pose of the real object OB1 performed by the association unit 113 will be described later. If the association unit 113 completes estimation of the pose of the real object OB1, the image setting unit 111 displays a new 2D model obtained by projecting the 3D model by using the estimated pose. At this time, the real object OB1 and the new 2D model displayed on the display section 20 overlap each other with higher accuracy.

The power supply 150 supplies power to the respective units of the image processing system SYS. For example, a secondary battery may be used as the power supply 150. The interface 140 is an interface which connects the main body 100 to various external apparatuses which are content supply sources. As the external apparatuses, for example, a personal computer (PC), a mobile phone terminal, smartphone, tablet, and a gaming terminal may be used. As the interface 140, for example, a USB interface, a microUSB interface, USB-C, and a memory card interface may be used. The data creation unit 112 may acquire captured image data of the real object OB1 via the interface 140.

The communication unit 130 performs wireless communication with other apparatuses such as a content server, a television set, smartphone, tablet, and a personal computer, based on a predetermined wireless communication standard such as a wireless LAN or Bluetooth (registered trademark). The data creation unit 112 may acquire captured image data of the real object OB1 and/or programs that are to be loaded into the main body 100 and used to realize functions described in the embodiments from other servers via the communication unit 130. Data creation without using marker The data creation unit 112 may employ data creation based on a marker and data creation without using a marker in order to associate captured image data of the real object OB1 captured by the imager 40 with data based on the 3D model of the real object OB1 stored in the 3D model storage portion 121. Here, the data creation without using a marker will be described, and the data creation based on a marker will be described in another embodiment.

Online Data Creation

Figure 3:
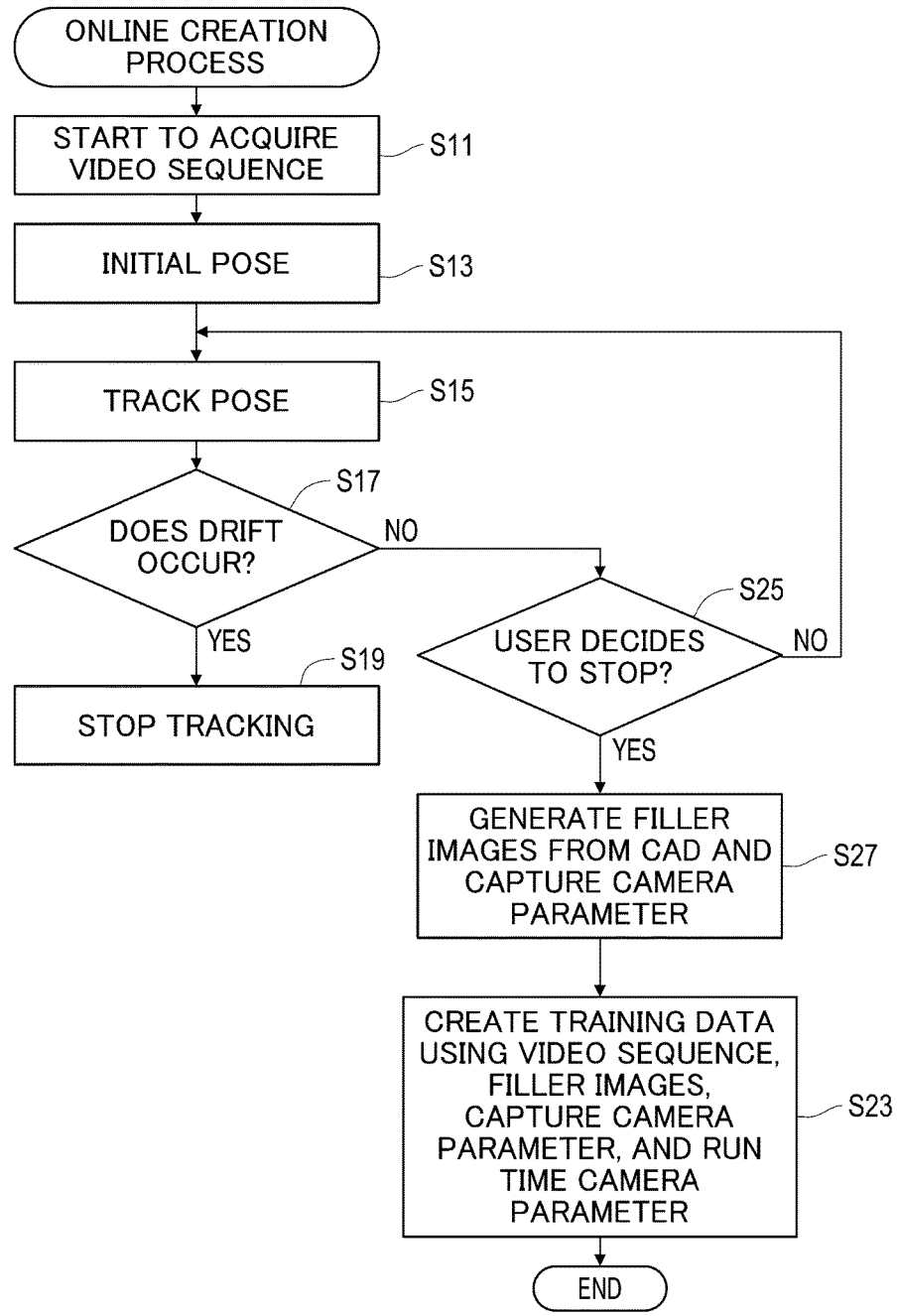
FIG. 3 is a flowchart illustrating an online creation process in which data is created online without using a marker.

FIG. 3 is a flowchart illustrating an online creation process in which data is created without using a marker online. In other words, online creation of training data means data that is created using real-time image collection footage. In this embodiment, a marker (or special pattern in the image frame for orientation improvement) is not used. The program for realizing the online creation process is stored in a memory medium (specifically in this embodiment, ROM 161). Data creation without using a marker includes two data creation processes such as an online creation process in which appearance data is acquired while imaging an object with the imager 40, and an offline creation process in which appearance data is acquired by using captured image data of the real object OB1 prepared in advance. Here, the online creation process will be described, and the offline creation process will be described later.

Pose Initialization

In the online creation process, first, the CPU 110 starts to acquire a video sequence (step S11). In the acquisition of the video sequence, the CPU 110 prompts a user to image the real object OB1 by using the imager 40. The image setting unit 111 displays the image of the real object OB1 on the display section 20. Simultaneously, the image setting unit 111 displays a 2D model obtained by projecting a 3D model onto a virtual plane based on a predetermined view, on the display section 20. As a result, the real object OB1 imaged by the imager 40 and the projected 2D model are displayed so as to overlap each other on the display section 20, but, in this stage, an image contour of the real object OB1 is not aligned with a contour of the 2D model. Next, the association unit 113 performs initialization of the pose (step S13).

Figure 4:
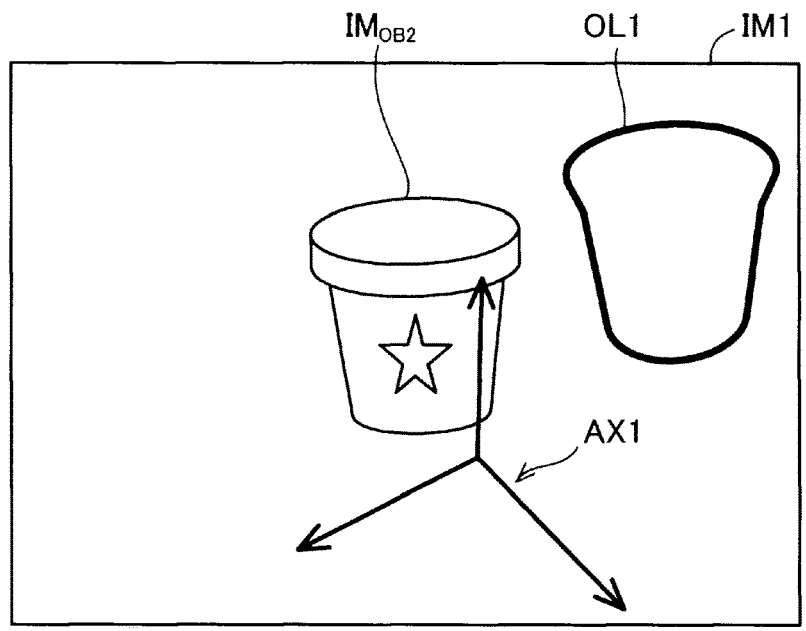
FIG. 4 is a diagram illustrating a display image in which a contour of a two-dimensional model and an image captured by an imager are displayed on a display section.
Figure 5:
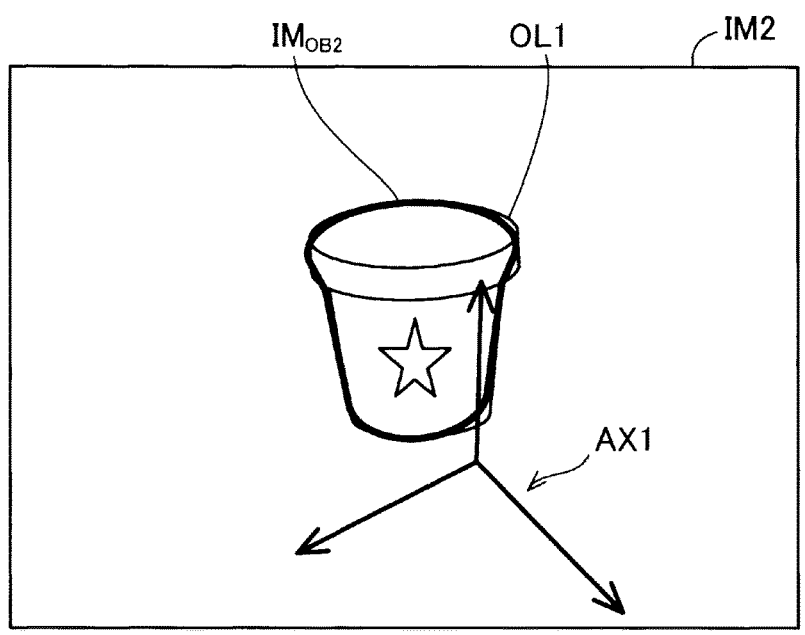
FIG. 5 is a diagram illustrating a display image in a state in which an image contour of a real object is substantially aligned with a contour of the 2D model.

FIG. 4 is a diagram illustrating a display image IM1 in which a contour OL1 of the 2D model and an image captured by an imager 40 are displayed on the display section 20. As illustrated in FIG. 4, the image of the real object OB1 captured by the imager 40 and displayed on the display section 20 is not aligned with the contour OL1 of the 2D model displayed on the display section 20. Thus, in the pose initialization process, the image setting unit 111 prompts the user to move the imager 40 so that the image contour of the real object OB1 is substantially aligned with the contour of the 2D model. The user is prompted to input a predetermined command to the operation section 30 in a case where the image contour of the real object OB1 is aligned with or substantially aligned with the contour of the 2D model. Coordinate axes AX1 illustrated in FIGS. 4 and 5 and the subsequent drawings are coordinate axes fixed to the real object OB1, and change depending on a change in a pose of the real object OB1 relative to the imager 40.

In a case where the operation section 30 receives the predetermined command, the association unit 113 searches on the image for image points corresponding to 2D model points included in the contour of the 2D model. Here, the 2D model points included in the contour of the 2D model may be selected in advance so as to be uniformly distributed along a contour line representing the 2D model. The image point corresponding to the 2D model point may be searched for by, for example, the CPU 110 selecting an image point having luminance gradient close to luminance gradient of the 2D model point from among a plurality of image points included in a region of neighborhood (for example, a pixel matrix of 3×3) centering on the 2D model point. The CPU 110 may compare two gradients with each other based on an inner product between two vectors.

The association unit 113 optimizes a pose represented by a rigid body conversion matrix included in view parameters based on the view and the depth map so that re-projection errors are minimized on a virtual plane (in this case, a plane corresponding to an imaging surface of the imager 40) based on 3D model points obtained by inversely converting the 2D model points, and image points corresponding to the 2D model points. Optimization, that is, refinement of the pose is performed through iterative computations using, for example, the Gauss-Newton method. The Gauss-Newton method is used to solve non-linear least squares problems. It is a modification of Newton's method for finding a minimum of a function.

If the pose is optimized (refined), the image contour and the contour of the 2D model are aligned with each other on the display section 20 with higher accuracy. The above process is also referred to as "pose initialization". A pose represented by a view where the two contours are aligned with each other substantially matches the pose of the real object OB1 relative to the imager 40. Image information of the real object OB1 in the captured image is stored as appearance data in association with the pose. The appearance data according to the present embodiment includes texture information (information regarding an appearance such as an edge, a pattern, or a color) of an outer surface of the real object OB1 imaged by the imager 40 in the pose.

An image point corresponding to the 2D model point is searched for by comparing detected edges with each other, but a well-known technique is applicable to edge detection, and, in other embodiments, an image point corresponding to a projected 2D model point may be searched for according to methods (for example, corner detection) other than the edge detection. In a case where the pose has been refined in the pose initialization, the CPU 110 may present information indicating that pose refinement is completed to the user via the display section. For example, the CPU 110 may change a color of the 2D model displayed on the display section 20 so as to present completion of the pose refinement to the user.

Pose Tracking

If the "pose initialization" is completed, the CPU 110 starts a process of tracking the pose of the real object OB1 (step S15). The pose tracking process according to the present embodiment is based on tracking of features (feature points) on the real object OB1 appearing in a captured image acquired by the imager 40. If preparation of the pose tracking process is completed, the CPU 110 prompts the user to move the imager 40 relative to the real object OB1. While the imager 40 is relatively being moved, a pose of the real object OB1 relative to the imager 40 is tracked by the CPU 110. The CPU 110 projects the 3D model onto the virtual plane by using the same pose as a pose of the real object OB1 updated through the tracking. Thus, even if the user moves the imager 40 while imaging the real object OB1, an image contour of the real object is kept substantially aligned with a contour of the 2D model on the display section 20.

In a case where a spatial relationship (a pose relative to the imager 40) between the imager 40 and the real object OB1 becomes a predetermined spatial relationship, the CPU 110 acquires image information of the real object OB1 in the spatial relationship as appearance data. The acquired appearance data is stored in association with the spatial relationship (pose).

Figure 7:
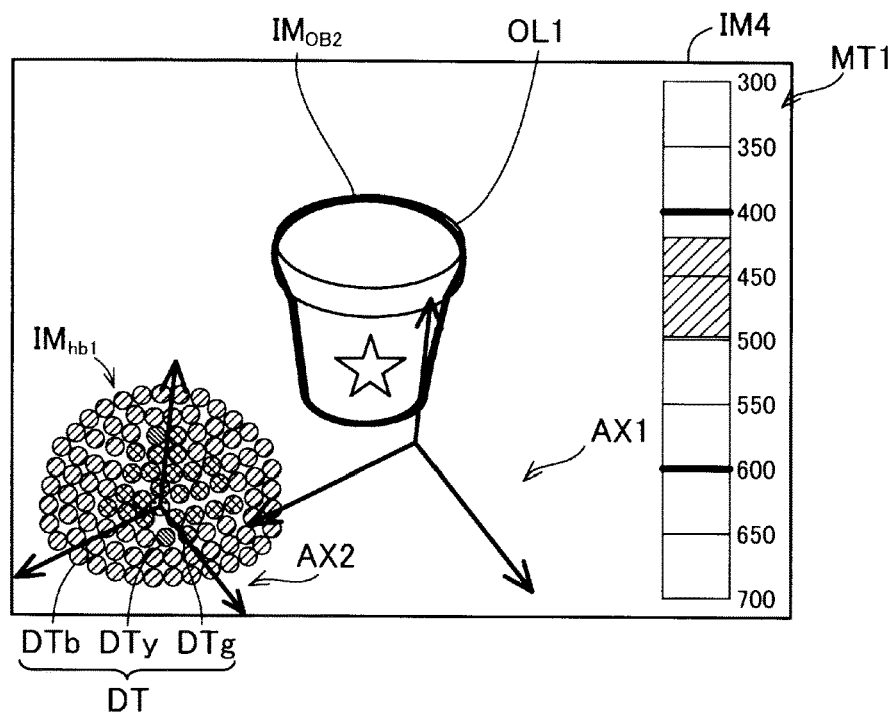
FIG. 7 is a diagram illustrating a display image displayed on the display section while a CPU is tracking a process of a real object.
Figure 8:
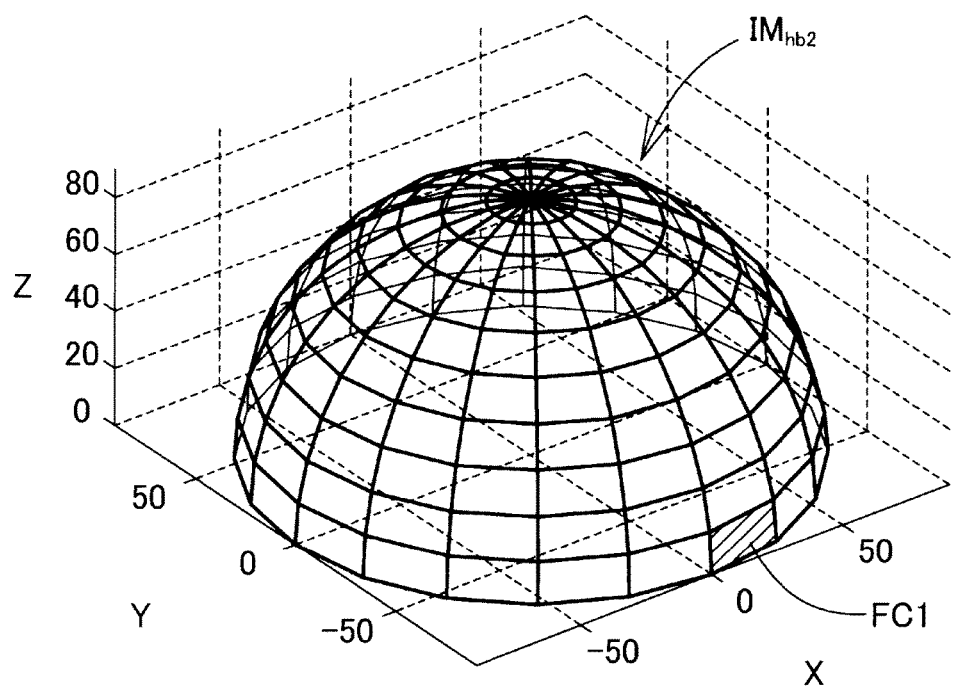
FIG. 8 is a diagram illustrating details of respective dots forming a hemisphere image.

FIG. 7 illustrates a display image IM4 for prompting the user to image the real object OB1 in the predetermined spatial relationship. In FIG. 7, the spatial relationships are expressed by a plurality of dots DT included in the display image IM4. The dots DT are distributed on a surface of a hemisphere image IMhb2 illustrated in FIG. 8. XYZ axes of a coordinate system of the hemisphere are represented in an object coordinate system, and the origin thereof corresponds to a point on the real object OB1 or the 3D model. A region FC1 that forms a part of the surface of the hemisphere image IMhb2 corresponds to a dot. In this embodiment, the dots have a resolution of 10 degrees spacing. Similarly, other regions on the surface correspond to respective dots. Also shown in FIG. 8 is a bounding box, represented by walls with dashed gridlines. The bounding box is a construct within software enclosing all of the possible coordinate locations that are processed within a scene. In some embodiments, the bounding box is not used in conjunction with rich feature keypoint data, and is only used with low feature data such as edges and contours.

The dots DT in the display image IM4 change in three colors. A blue dot DTb indicates a state in which appearance data of the real object OB1 has not been obtained yet in the spatial relationship represented by the dot DTb. A green dot DTg indicates that appearance data has been obtained in the spatial relationship represented by the dot DTg. A yellow dot DTy indicates that more appearance data is required to be obtained in the spatial relationship represented by the dot DTy. In other words, if all the dots DT change from the blue dots DTb to the green dots DTg, this notifies the user that appearance data of the real object OB1 has been acquired in all of the predetermined spatial relationships. In the present embodiment, the "location" includes the concept of "orientation", and, thus, even if coordinate values of the imager 40 do not change, a state in which an orientation of an optical axis of the imager 40 changes is also referred to as a state in which a location of the imager 40 changes.

Figure 6:
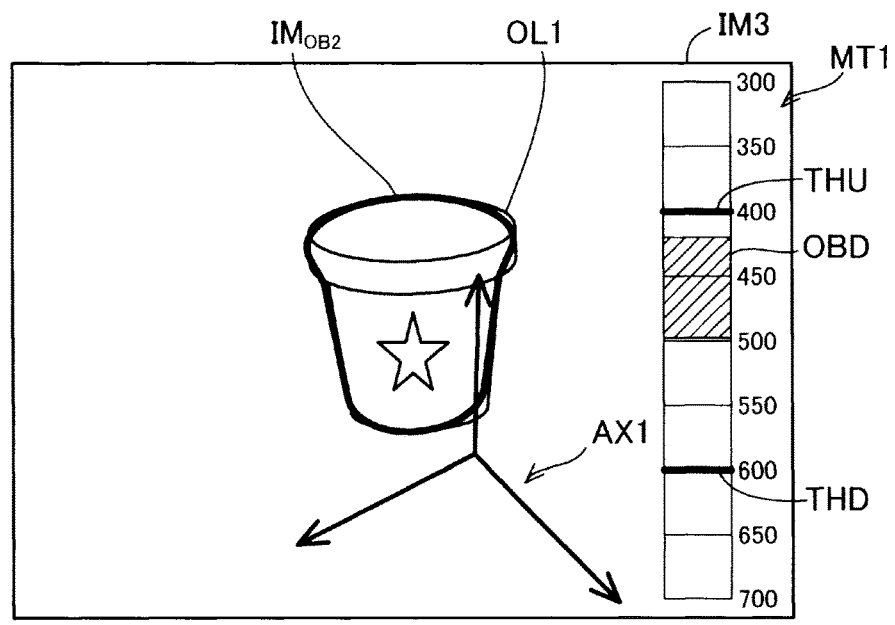
FIG. 6 is a diagram illustrating a display image which is displayed on the display section in a case where an object distance is compared with a preset threshold value.

In order to cause the user to recognize a distance between the imager 40 and the real object OB1 in the predetermined spatial relationship, a display image IM3 illustrated in FIG. 6 may be displayed. As illustrated in FIG. 6, in the display image IM3, a meter MT1 is further displayed on the display section 20 compared with the display image IM2 illustrated in FIG. 5. The meter MT1 is an image indicating a distance (hereinafter, referred to as an object distance) between the imager 40 and the real object OB1. The meter MT1 includes a threshold value upper limit THU, a threshold value lower limit THL, and an object distance OBD (hatched region). The threshold value upper limit THU indicates an upper limit of a preset range of threshold values. The threshold value lower limit THL indicates a lower limit of the preset range of threshold values. The object distance OBD indicates an object distance included in a spatial relationship specified by the data creation unit 112. The reason why the object distance OBD indicates a predetermined range is that a distance specified by the data creation unit 112 has a predetermined width.

If template data created through the above-described process is used, an object detection device such as head-mounted display device 142 (HMD 142 shown in FIG. 14) can detect the real object OB1 in wider or increased spatial relationships with high accuracy by using a camera 148. An example of an HMD is disclosed in U.S. application Ser. No. 15/710,148, which is incorporated herein in its entirety. Camera 148 of the HMD 142 is the run-time camera according to one embodiment. Camera 148 of HMD 142 may also be a capture camera, in an embodiment. In other words, the same camera 148 may be used as the capture camera and run-time camera.

HMD 142 also includes a CPU 146, storage unit 141, and display 145, which have similar functions to CPU 110, storage unit 120, and display section 20, respectively, as described with respect to system SYS, especially relative to FIG. 2. For example, CPU 146 of HMD 142 may be configured to perform the methods describe herein that are performed by CPU 110 of systems SYS and SYSa. Display 145 may be configured to perform the functions performed by display section 20 if systems SYS and SYSa. Display 145 may be configured to also perform other functions such as AR functions.

HMD 142 also includes a communicator 144, which enables communication with a network or computer device. HMD 142 can receive data, such as the 3D model data for rendering an AR object, via communicator 144. This data can be stored in storage unit 141. Storage unit 141 may also store training data once that data is generated, and later use the training data to detect and track objects within the field of view of camera 148. Once objects are detected by HMD 142, artificial or virtual images are rendered by CPU 146 and displayed on display 145 in a desired locational relationship with the object, which is simultaneously viewed by a user.

Stoppage of Pose Tracking

In a case where features of the real object OB1 vanishes or motion blurring occurs in a captured image acquired by the imager 40 during pose tracking, a tracked pose may be drifted. In this case, tracking of a pose may be stopped. Pose initialization is preferably performed again in the pose whose tracking is stopped. Then, a pose at the time of acquiring appearance data and a pose at the time of projecting a 3D model to obtain a 2D model are kept matched each other with high accuracy over a plurality of poses (spatial relationships) to be sampled.

Therefore, after the process in step S15 in FIG. 3 has started, the data creation unit 112 determines whether or not a pose is drifted during tracking of a pose (step S17). The determination may be performed by a user input based on observation performed by the user, or through analysis in the CPU 110 based on tracking. For example, if a user notices that the object and a superimposed virtual image tracking the object begin to drift apart, then drifting can be indicated by the user. The CPU 110 can also detect drift by using collected image data and inertial sensor or location sensor data to detect a difference between estimated pose and pose as determined by the images collected. In a case where the data creation unit 112 determines that drift is detected (YES in step S17), the data creation unit 112 stops pose tracking (step S19) and may return to step S13 so as to perform pose initialization again since there is a concern that an accurate pose of the real object OB1 may not be specified.

In a case where it is determined that drift is not detected in the process in step S17 (NO in step S17), the data creation unit 112 determines whether or not the user has decided to stop acquiring the video sequence (step S21) such as receiving a request from the user to stop. Ideally, in one embodiment, sufficient video images would be collected so that all of the dots DT forming a hemisphere image IMhb1 illustrated in FIG. 7 change to the green dots DTg (in FIG. 7, the hemisphere image IMhb1 is associated with the coordinate axes AX2). At this point, the user may decide that enough video has been acquired and thus, stop the video data acquisition of object OB1.

However, a user will often become frustrated attempting to collect the large amount of video data of object OB1, from such a large number of angles (i.e. from an entire hemisphere surrounding object OB1). Some angles, such as at the very upper and lower portions of the hemisphere, are particularly difficult to obtain data for. In order to improve the user experience, the method according to FIG. 3 stops collecting appearance data upon a user request (after YES on step S25), and uses the video data already collected along with synthetic images to generate training data when the user chooses to stop (YES in step S25). If the user does not choose to stop (NO in step S25) such that the user request to stop is not received by the system, appearance data will continue to be collected, the pose will continue to be tracked, and drift will continually be detected in steps S15 and S17, as discussed above.

If a user does decide to stop (YES in step S25), the system uses appearance data that have already been collected by the camera in the points of view in hemisphere IMhb1, and for points of view that have not been collected in hemisphere IMhb1, the method generates "filler images" from CAD and parameters of the capture camera (step S27).

In some embodiments, the "filler images" (also referred to herein as "synthetic images"), as used herein, refers to images that the CPU 110 generates based on the camera parameter by rendering the 3D model at a particular view angle to obtain a 2D image from the 3D model from that view angle, but the filler/synthetic images are not images captured by the camera (referred to herein as a "real images"). In other words, the synthetic image is a virtual rendering of the object as the CPU 110 would expect that object to appear from the capture camera's perspective from a particular view angle. Each synthetic image is generated by CPU 110 using the view angle, a 3D model (i.e. CAD model) of the object, and the capture camera parameters, in some embodiments. In several embodiments, synthetic images are obtained for all view angles within hemisphere IMhb1 where a real image has not been captured of the object. In one embodiment, the view angle includes an azimuth component and an elevation component. The view angle may also include a distance component that sets a distance of the potential locations in the view range from the 3D model of the object. Each view angle for which a synthetic image is generated represents a different pose of the object.

The CPU 110, or a user, determines which view angles require filler images by determining the locations of the view angles of the real images that were collected before the user ended the image collection. This can be done by mapping the view angles for the real images on hemisphere IMhb1 and subtracting view angles corresponding to real images from a list of view angles for which synthetic images should be made. In some embodiments, rather than synthetic images being made for all angles in IMhb1, synthetic images are made at a lower angular resolution. For example, CPU 110 could determine the areas in hemisphere IMhb1 where the amount of real images are fewest, and determine angles for which synthetic images are made based on that information.

In another embodiment, a user is given a proposed camera path for collection of real images that will result in improved data collection, without collecting real images for all of hemisphere IMhb1. In other words, a visual element could appear to the user via a display on the HMD or smartphone, which would indicate a direction to move the capture camera to collect real images. An optimization algorithm could be used to determine an optimal collection of real images that are suggested to the user.

In some embodiments, the user obtains real images of the object that are at a desired view angle, but at a distance from the center of hemisphere IMhb1 that is so great as to be outside of hemisphere IMhb1. In that case, CPU 110 may either generate a synthetic image for that angle, or enlarge or reduce the size of the real image to generate a "modified real image" for that angle, which will later be used to generate training data.

To further improve the user experience, it is advantageous to allow real image collection of the reference object using a different camera (referred to herein as a "capture camera") than the camera for the intended application, in an embodiment. For example, an imager 40 on a smartphone or tablet could be used as the capture camera, because the smartphone or tablet may be easier to maneuver by the user than, e.g., an HMD 142, which may be the intended device. This may enable the user to capture real images from more view angles of the reference object, thereby enhancing the user experience. The camera on the intended device for use is referred to herein as a "run-time camera," and, in the above-described example, is the camera 148 on HMD 142. Accordingly, the CPU 110 conducts a conversion between image data collected from the capture camera to image data that would be collected from the run-time camera using the received capture camera parameters and run-time camera parameters. This conversion is conducted when converting real images collected using the capture camera (and synthetic filler images) into training data. In one embodiment, this conversion is calculated using the following equation for rich feature points (i.e. corners or patches of pixels with unusual image characteristics).

Capture camera intrinsic parameters (in pixels)=$\{F_x^T, F_y^T, C_x^T, C_y^T\}$.

Runtime camera intrinsic parameters (in pixels)=$\{F_x^R, F_y^R, C_x^R, C_y^R\}$.

Runtime image downsampling factor=$S^R$ $$S_x = \frac{F_x^R}{F_x^T S^R}, S_y = \frac{F_y^R}{F_y^T S^R}$$

According to the above formula, training images are scaled using bilinear interpolation before feature detection to ensure the object has the same size in pixels in both training and run-time images. Unfortunately, bilinear interpolation blurs training images. Therefore, when both scaling factors are within the $$\left[\frac{1}{1.05} \ldots 1.05\right]$$

range (less than 5% difference), the training images are used as is (i.e. without scaling).

Since low feature ("LF") training data (e.g. edges and contours) is generated at a low resolution (e.g., 80×60 pixels), image blur is not an issue. Low feature training data includes an object bounding box offset from a predetermined point (for example, in this described embodiment, the top left corner) of the training image, which is used at runtime to convert 2D template match locations to 3D object coordinates. When the capture camera is different from the run-time camera, the bounding box offset is modified by the principal point shift difference calculated as follows:

$$\Delta C_x = \frac{C_x^R}{S^R} - C_x^T S_x, \Delta C_y = \frac{C_y^R}{S^R} - C_y^T S_y$$

Point ($t_x$, $t_y$) may refer to the template location in the training image (in pixels). In the above embodiment, each LF training view includes the template offset from the top left corner, $(O_x^T, O_y^T)=(t_x+\Delta C_x, t_y+\Delta C_y)$, and the object pose in the training image P consisting of the rotation matrix R and translation vector, $T=[T_x\ T_y\ T_z]$. Point ($m_x$, $m_y$) may refer to the template match location in the run-time image (in pixels). Then, the object pose in the run-time image is combined from the same rotation matrix R and translation vector $$T' = \left[T_x + \frac{(m_x - O_x^T)T_z}{F_x^R}T_y + \frac{(m_y - O_y^T)T_z}{F_y^R}T_z\right].$$

After filler/synthetic images are generated (step S27), the data creation unit 112 creates association data (also referred to as a "template data" or "training data") in which (i) a spatial relationship (pose) and feature information (on feature locations and descriptors) obtained from the captured image of the real object OB1 in that spatial relationship are associated with each other, (ii) another spatial relationship and feature information obtained from the filler/synthetic image in that spatial relationship are associated with each other (step S23), and optionally (iii) 3D points on the 3D model represented in the 3D model frame of reference, the 3D points corresponding to the feature points. Note that the 3D points may be calculated on the basis of the feature locations and the depth map data obtained from the 3D model. After that, the data creation unit 112 finishes the online creation process. Then the data creation unit 112 stores the created association template data in the created data storage portion 122.

Figure 15:
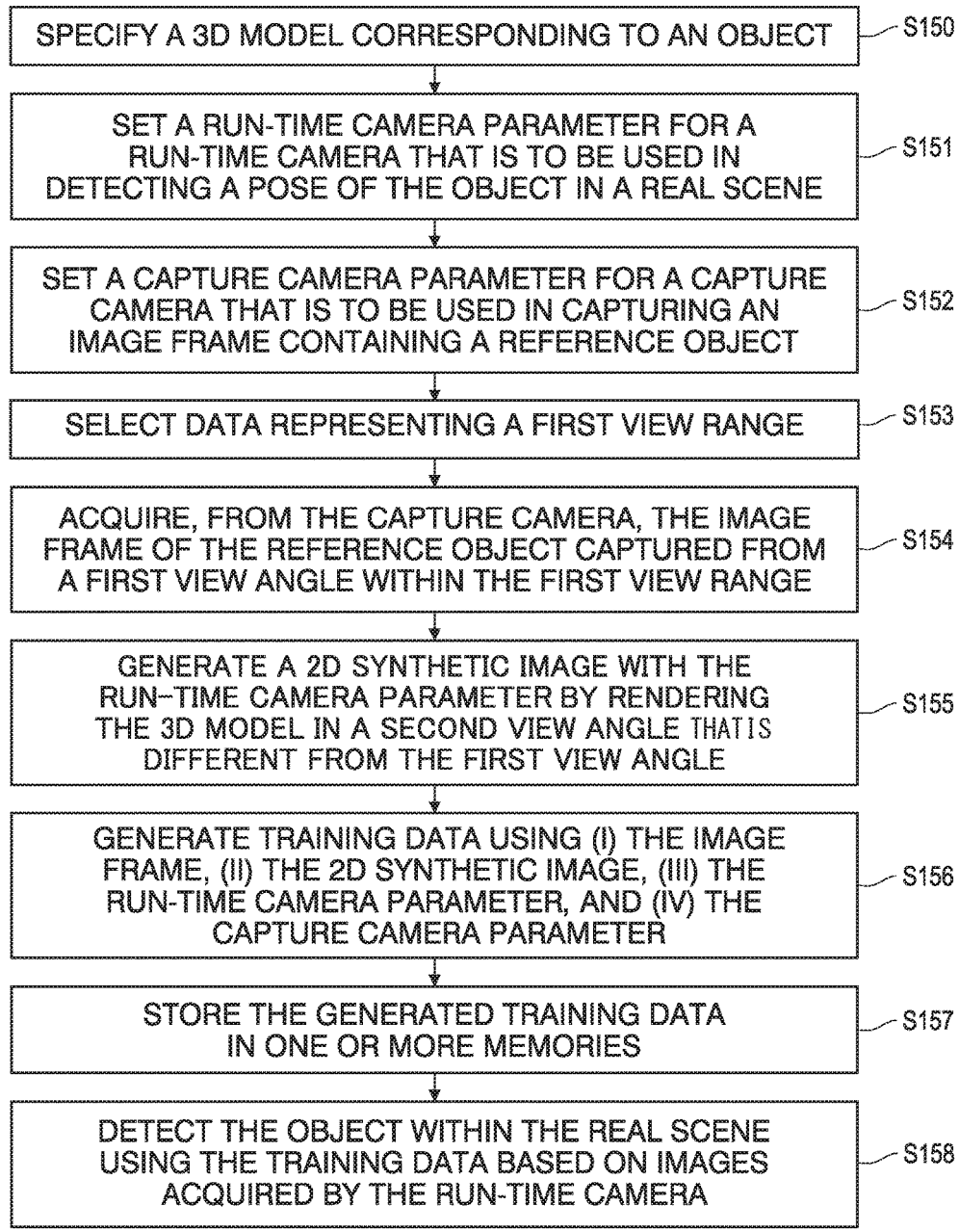
FIG. 15 is a flowchart of a method according to one embodiment.

FIG. 15 shows the method described in FIG. 3, with additional details concerning the generation of filler images and the use of the training data. According to the method, first, a 3D model corresponding to object OB1 is specified (step S150). This is achieved by identifying the object OB1 using either a CPU or human, and locating and retrieving a computer file including a 3D model of that object OB1. This model may be stored in storage unit 120, ROM, or RAM, or may be obtained via a network through communication unit 130. Additionally, a user may select the appropriate 3D model using display 20 and operation section 30 as interfaces.

Next, in step S151, the CPU 110 or user sets a run-time camera parameter for a run-time camera that is to be used in detecting a pose of the object in a real scene. Specifically, it is determined what device will be used for pose detection of the object (i.e. what device is being trained with the training data). The attributes of the camera 148 included in that device are used to set the run-time camera parameters. This information can include, the make and model of camera 148, its general location relative to the eyes of a user in operation, the optical properties of the lenses within the camera, the focal length, the field of view, etc. . . . . In either case, the run-time camera parameter will be able to assist the CPU in converting capture camera images into run-time camera images, and generating the synthetic filler images.

Pose detection is the detection of an object's relative position to a camera. This can be done using the location of keypoints (or feature points) on the object within an image captured by the run-time camera, which are used to determine a location and orientation of the object within the scene. For example, relative locations of the keypoints in the image can be used to determine relative orientation of the object OB1 and the camera 148 that took the image. In other words, the rotation of the points in the image frame can indicate a rotational relationship between the object and the camera. Similarly, a translation of the points can indicate a translational relationship. The distance between the points can indicate a distance between the camera and the object. Similarly, the location of the keypoints within the image can be used to determine the location of the object OB1 relative to the camera 148 that took the image.

Next, in step S152, the CPU 110 or user sets a capture camera parameter for a capture camera that is to be used in capturing an image frame containing a reference object. This is similar to the run-time parameter described above, except it corresponds to the capture camera. The capture camera 40 is the camera that is used to capture real images of a reference object in order to generate training data. The capture camera is not necessarily the same as the run-time camera in some embodiments, but in other embodiments the capture camera and the run-time camera are the same so that there is only one camera capturing data. In some embodiments, the capture camera is part of a smartphone or tablet, while the run-time camera is part of an HMD.

Next, in step S153, the CPU 110 or user selects data representing a first view range. In other words, data for view range from which the image of the reference object will be taken is selected. This data may include the angular location information and distance from the object.

Next, in step S154, the CPU 110 or user acquires from the capture camera, the image frame of the reference object captured from a first view angle within the first view range. In other words, a picture is taken using the capture camera of the reference object from the view frame.

Next, in step S155, the CPU 110 or user generates a 2D synthetic image with any camera parameter by rendering the 3D model in a second view angle being different from the first view angle. This process is described in more detail above. A synthetic image is generated for a view angle that is different from the view angle corresponding to the real image captured by the capture camera.

Next, in step S156, the CPU 110 or user generates training data using (i) the image frame, (ii) the 2D synthetic image, and (iii) the run-time camera parameter, and (iv) the capture camera parameter. This is achieved by converting the image frames (real image data collected for a view angle) and the synthetic images from images corresponding to the capture camera to images corresponding to the run-time camera. This conversion method is described above and is achieved using the parameters for the capture camera and run-time camera to generate a transfer function which converts pixels from the images into equivalent run-time camera images. These run-time camera images are the real images and synthetic images as they would appear to the run-time camera. Once the run-time camera images are generated, training data is generated by e.g. extracting feature points and edges and contours from the images so that the object therein can be recognized in a real-world scene using the run-time camera.

Next, in step S157, the CPU 110 or user stores the generated training data in one or more memories, e.g. in storage unit 120 or storage unit 141 on HMD 142. This training data is later used by a processor connected to the run-time camera to detect and track the object within a real scene. Specifically, appearance characteristics of the reference object are stored as training data. These include feature points, contours, and edges at the view angles shown in the hemisphere IMhb1.

Next, in step S158, a processor connected to the run-time camera detects the object within the real scene using (i) the generated training data and (ii) images acquired by the run-time camera. This step is described in more detail above. In summary, the training data will include information (such as locations and descriptors) of important keypoints, features, textures, contours, and shapes of the object as viewed from many different viewing angles. This enables the processor to recognize the object from any view angle it will likely encounter during object detection and tracking in e.g. an AR application. It is noted that, in another embodiment, the training data may also include 3D model points corresponding to 2D locations of the features described above, and their corresponding view. The 3D model points may be represented, for example, in the 3D model frame of reference. It is also noted that, in still another embodiment, the training data may also include real and/or synthetic images associated with respective views.

Offline Data Creation

An offline data creation process is different from the online data creation process in terms of "pose tracking." Offline data creation means creating training data using image data that has been collected in advance.

Figure 9:
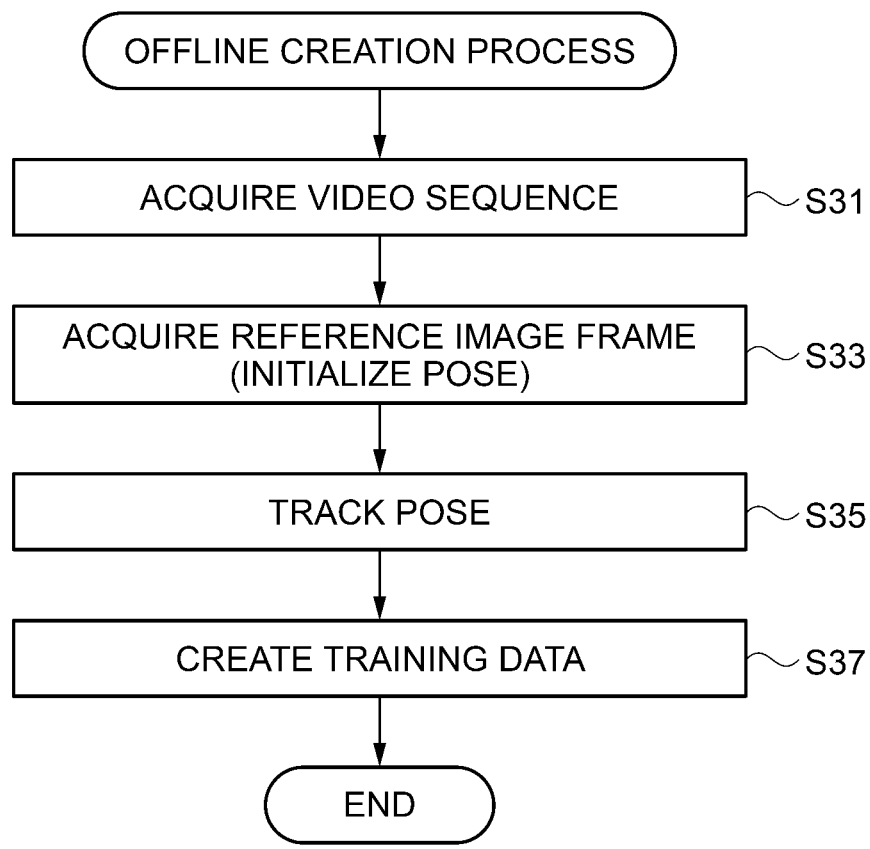
FIG. 9 is a flowchart illustrating an offline creation process.

FIG. 9 is a diagram illustrating a flow of the offline creation process. The program for realizing the offline creation process is stored in a memory medium (specifically in this embodiment, ROM 161). In the offline creation process, first, the CPU 110 performs acquisition of a video sequence (step S31). In the performed acquisition of the video sequence, a user images the real object OB1 with the imager 40 in advance. At this time, the imager 40 is relatively moved so that poses of the real object OB1 relative to the imager 40 correspond to all spatial relationships represented by the dots in FIG. 7 or 13. The CPU 110 records the video sequence of the real object OB1 through the imaging in the imager 40. The CPU 110 selects an image frame in which the real object OB1 having a pose close to a pose represented in a predetermined view is imaged, from among image frames forming the video sequence. Regarding a method of selecting an image frame that is also referred to as a reference image frame in the present embodiment, the image frame may be automatically selected in image processing performed by the CPU 110, and may be selected by the user. A pose of the real object OB1 in the selected image frame is estimated. A method of estimating a pose may be the same as the method described in the process related to the online data creation process.

Next, the CPU 110 acquires a reference image frame (step S33). A pose of the real object OB1 imaged in each of the image frames in the preceding and succeeding of the time axis with respect to the selected image frame is tracked (step S35). In this case, bundle adjustment is locally or entirely applied to the reference image frame, and thus estimation of the pose of the real object OB1 is refined with respect to each image frame. The appearance data of the real object OB1 is acquired and is recorded at a predetermined timing. Training data is created as described in the above embodiment (step S37), is stored as a template, and the offline creation process is finished.

As described above, in the image processing system SYS of the present embodiment, the data creation unit 112 uses a video sequence recorded by imaging the real object OB1 in advance, as captured image data of the real object OB1, when creating association data in the offline creation process. Therefore, in the offline creation process, when the data creation unit 112 estimates a pose of the real object OB1, an image frame to which bundle adjustment is applied is used, and thus estimation of a pose can be refined. The data creation unit 112 can partially solve the problem of the occurrence of drift by using such image frames.

In another embodiment, in a case where a preset marker is present in an imaging region of the imager 40 in addition to an object, the imager 40 performs estimation and tracking of a pose of the real object OB1 with a coordinate axis set in the marker as a reference.

Configuration of Image Processing System

Figure 10:
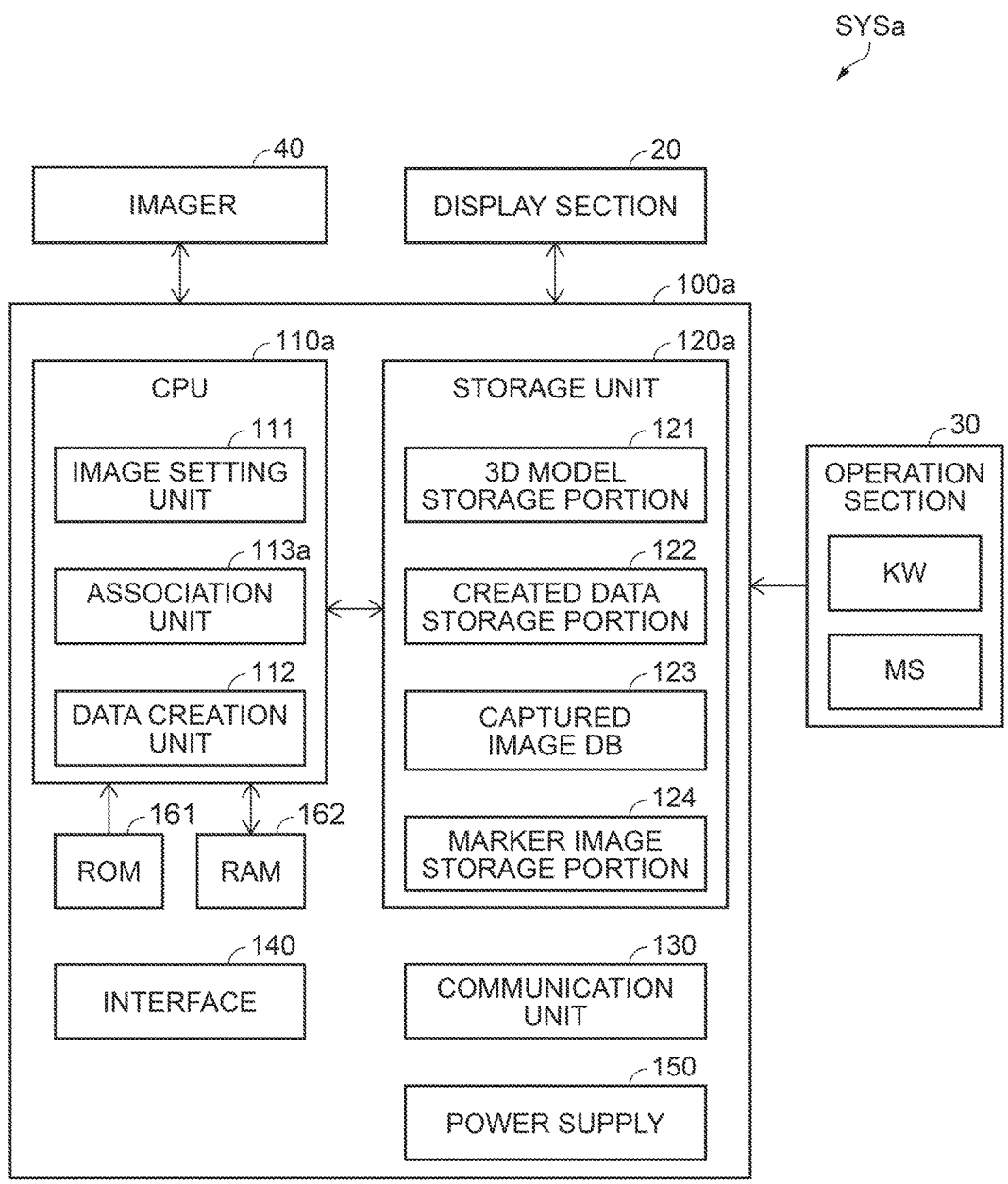
FIG. 10 is a block diagram illustrating a functional configuration of an image processing system in one embodiment.

FIG. 10 is a block diagram illustrating a functional configuration of an image processing system SYSa in this embodiment. The image processing system SYSa of this embodiment is different from the image processing system SYS of the previous embodiment in that a storage unit 120a includes a marker image storage portion 124, and an association unit 113a of a CPU 110a performs different processes. Thus, in this embodiment, the same constituent elements as those of the image processing system SYS of the previous embodiment will not be described.

The marker image storage portion 124 of the storage unit 120a stores a preset marker model. The marker model represents a plane marker, but a marker coordinate system is represented by three axes (an X axis, a Y axis, and a Z axis) which are orthogonal to each other.

Data Creation Based on Marker

Pose Initialization

Figure 11:
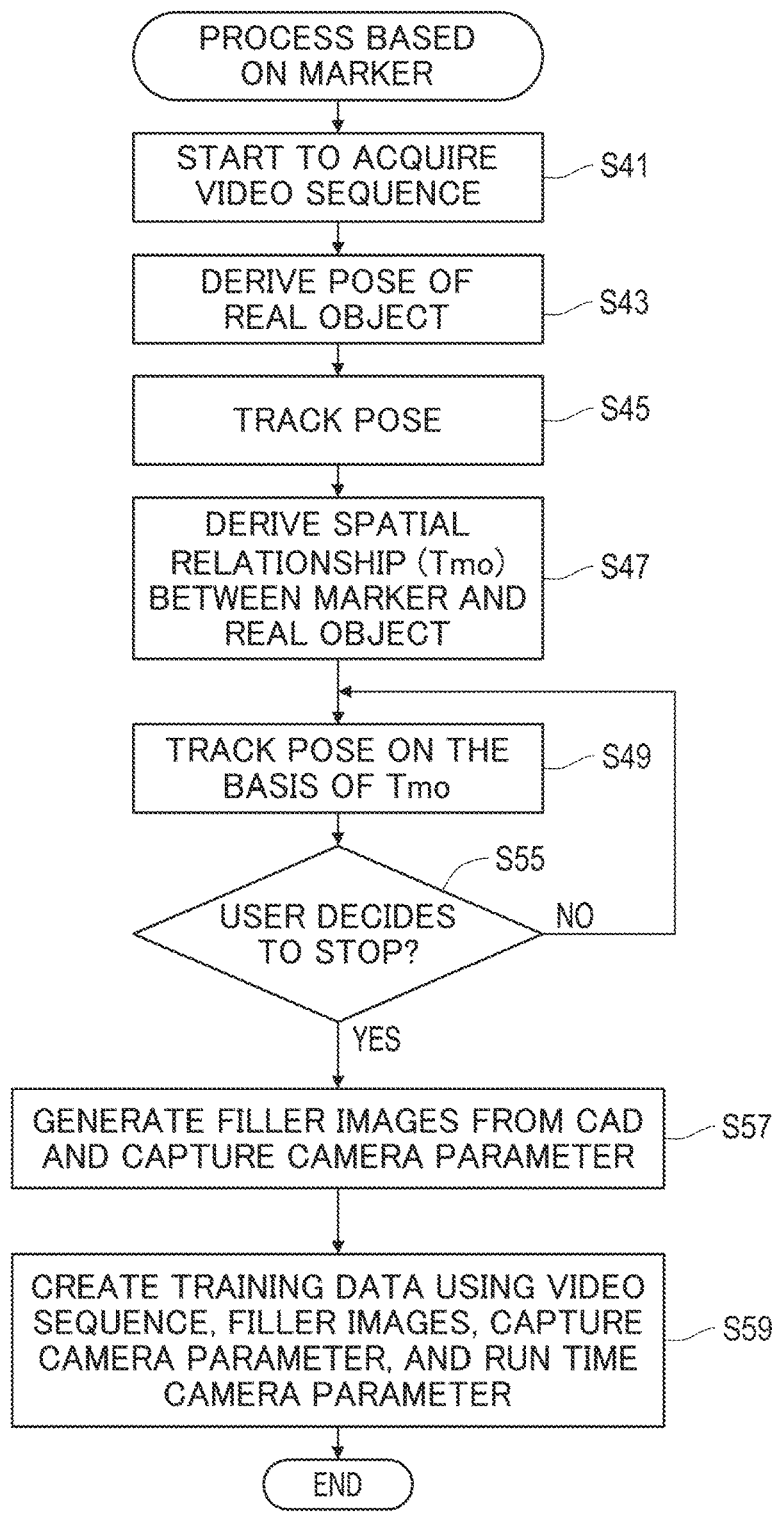
FIG. 11 is a flowchart illustrating an online creation process in which data is created based on a marker online in one embodiment.

FIG. 11 is a diagram illustrating a flow of a process based on a marker in this embodiment. In other words, the process uses the location of a known marker relative to the object in a captured image in order to establish initial pose information. Programs used to realize the process flow are stored in a memory medium (for example, in this embodiment, ROM 161). FIG. 11 will be described using FIGS. 12 and 13.

Figure 12:
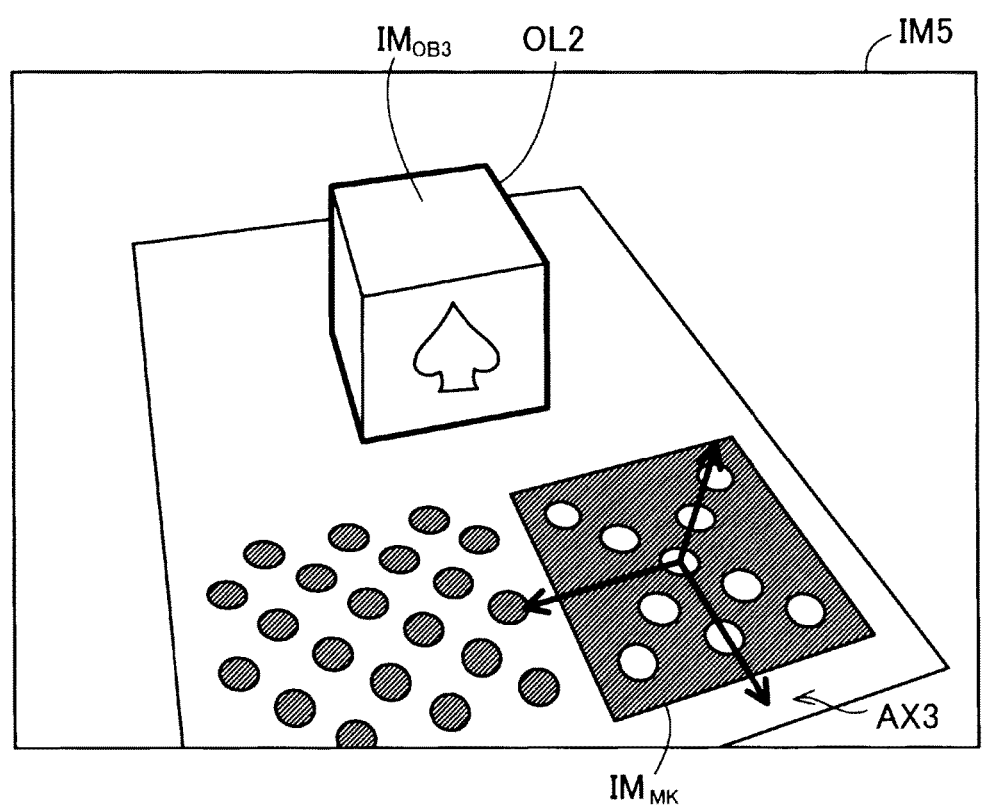
FIG. 12 is a diagram illustrating a display image including coordinate axes, displayed on a display section in a case where an imager captures a marker image.

Referring first to FIG. 12 in describing the method of FIG. 11, FIG. 12 shows a display image IM5. The display image IM5 includes coordinate axes AX3 that are displayed on the display section 20 when the imager 40 images a marker image IMMK. In a case where a command is received from the user, the CPU 110a starts to acquire a video sequence (step S41), and derives a pose of the real object OB1 about each image frame of the video sequence (step S43). These steps are similar to steps S11 and S13, respectively, discussed above relative to FIG. 3. For example, the user may align an image contour of the real object IMOB3 with a contour OL2 of a 2D model obtained based on a 3D model corresponding to the real object, and then the CPU 110a may estimate a pose of the real object by deriving (optimizing) view parameters which minimize re-projection errors between image points and 2D model points corresponding to each other (FIG. 12).

The CPU 110a may compute a reliability score for the derived pose, and may notify the user of the score via the UI. The user may accept the pose or may perform the process again in step S43 based on the score. Unlike the method not using a marker described in the previous embodiment, the estimated pose at this step is not included in training data (template).

The user keeps relatively moving the imager around the real object OB1 so as to collect video sequences from various angles and to continuously record the video sequences. During that time, the CPU 110a tracks a pose of the real object and continuously records the pose (step S45).

Figure 13:
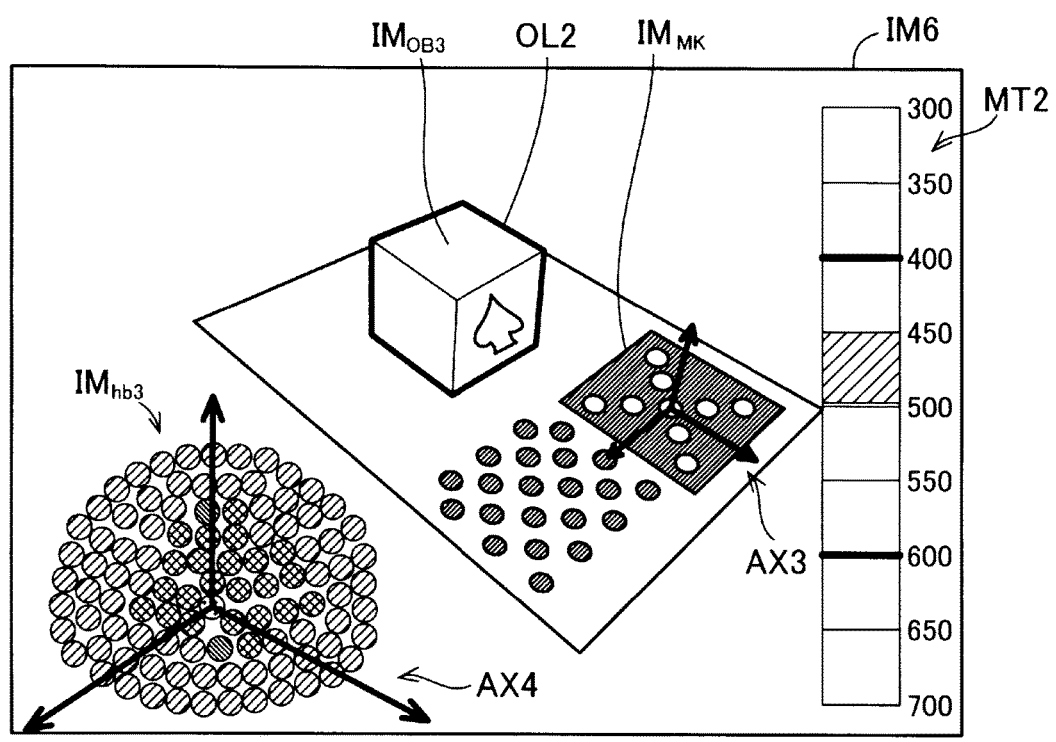
FIG. 13 is a diagram illustrating a display image displayed on the display section while the imager is tracking a pose of an object.

Referring now to FIG. 13 in continuing to describe the method of FIG. 11, FIG. 13 illustrates a display image IM5 for prompting the user to image the real object OB1 in the predetermined spatial relationship. In FIG. 13, the spatial relationships are expressed by a plurality of dots DT included in the display image IM6. The display image IM6 includes coordinate axes AX4 that are displayed on the display section 20 when the imager 40 images a marker image IMMK. The dots DT are distributed on a surface of a hemisphere image IMhb3 (similarly as in FIGS. 7 and 8). The dots DT in the display image IM4 change in three colors. In order to cause the user to recognize a distance between the imager 40 and the real object OB1 and marker IMMK in the predetermined spatial relationship, a meter MT2 is further displayed on the display section 20. The meter MT2 is an image indicating a distance (hereinafter, referred to as an object distance) between the imager 40 and the real object OB1.

If template data created through the above-described process is used, an object detection device such as head-mounted display device 142 (HMD 142 shown in FIG. 14) can detect the real object OB1 in wider or increased spatial relationships with high accuracy by using a camera 148.

It is unlikely that all of the dots DT forming a hemisphere image IMhb3 illustrated in FIG. 13 change to the green dots DTg, because the user will stop collecting data before this is completed. At this stage, the method of FIG. 11 is employed to generate filler images for the dots for which real image data has not been collected.

If sufficient images are collected, the CPU 110a calls (activates) a multiview improvement algorithm (AutoFit) provided as a function of the software so as to perform the following process in response to a command from the user. First, the CPU 110a obtains a pose of the plane marker relative to the imager 40 with respect to each image frame included in the video sequence. In the present embodiment, a pose of the plane marker is derived according to a method using a homography matrix. Generally, acquiring a 3D pose of the plane marker with high accuracy is easier than acquiring a 3D pose of any 3D object with high accuracy. An accurate pose (this pose is indicated by Tmo; here, the suffix o indicates an object coordinate system, the suffix m indicates a marker coordinate system, and T indicates a conversion matrix between both of the coordinate systems) between the plane marker and the real object by using each tracked pose of the real object OB1 and a pose of the plane marker included in each same image frame is estimated, thereby deriving a spatial relationship between the marker and the real object (step S47). The above-described steps S41 to S47 correspond to the pose initialization of the previous embodiment of FIG. 3 (i.e. step S13).

Thereafter, even if the user moves the imager 40 relative to the real object OB1, it is possible to track a pose of the real object OB1 with higher accuracy based on the pose of the plane marker and the pose Tmo between the plane marker and the real object OB1 (step S49). A 2D model obtained by projecting a 3D model onto a virtual plane based on a predetermined pose is displayed so as to overlap the video sequence in the same method as the method described in the previous embodiment, and the user aligns an image contour of the real object with a contour of the 2D model by operating the mouse or the like.

In a case where the image contour of the real object is substantially aligned with the contour of the 2D model, the CPU 110*a* stores appearance data in the pose. Alignment between the image contour of the real object and the contour of the 2D model in the CPU 110*a* may be determined based on completion of deriving (optimization) of view parameters which minimize re-projecting errors between image points and 2D model points corresponding to each other, and/or may be determined based on an instruction from the user based on naked eye observation when the optimization cannot be used. In the same manner as in the previous embodiment, with respect to all poses represented by the dots DT in FIGS. 7 and 13, a pose of the real object OB1 and appearance data in the pose are stored in association with each other.

In a case where the user does not decide to stop the collection process (NO in step S55), the process returns to step S49, and the CPU 110*a* prompts the user to keep relatively moving the imager 40. In a case where a user decides to stop collection of the video sequence (YES in step S55), the already collected appearance data will be used. For points of view that have not been collected in hemisphere IMhb3, the method generates filler images from CAD and parameters of the capture camera (step S57).

Afterward, the association data items are collected and stored as association data (training data) (step S59), and the process based on a marker is finished. According to another embodiment, it is noted that once the pose of the real object OB1 is estimated (step S43), it is not necessary to perform step S45 to track the pose of the real object OB1, since the CPU 110*a* may track the pose of the real object OB1 by tacking the pose of the plane marker using the relationship represented by Tmo.

The system may be implemented in forms aspects other than the information processing device. For example, the system may be implemented in forms such as a head mounted display, a display device, a control method for the information processing device and the display device, an information processing system, a computer program for realizing functions of the information processing device, a recording medium (i.e. non-transient storage medium) recording the computer program thereon, a mobile device, a smartphone, a tablet, and data signals which include the computer program and are embodied in carrier waves.

The embodiments described herein result in technological improvement in the computer vision functions of the computer, HMD, mobile device, vehicle, or other device on which it is implemented. Specifically, object location and tracking accuracy is improved, because real image data is used for generating training data. Moreover, the user experience is improved, because real image data does not need to be collected for an entire range of view angles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A non-transitory computer readable medium that embodies instructions that cause one or more processors to perform a method comprising:
 (A) specifying a 3D model, stored in one or more memories, corresponding to an object;
 (B) setting a run-time camera parameter for a run-time camera that is to be used in detecting a pose of the object in a real scene by:
  receiving, through a data communication port, information representing an Augmented-Reality (AR) device having the run-time camera; and
  acquiring, from one or more memories, the runtime camera parameter corresponding to the AR device in response to the information, a plurality of the run-time camera parameters and corresponding AR devices being associated with each other in one or more memories;
 (C) setting a capture camera parameter for a capture camera that is to be used in capturing an image frame containing a reference object;
 (D) acquiring, from the capture camera, the image frame of the reference object captured from a first view angle;
 (E) generating a 2D synthetic image by rendering the 3D model in a second view angle that is different from the first view angle;
 (F) generating training data using (i) the image frame, (ii) the 2D synthetic image, (iii) the run-time camera parameter, and (iv) the capture camera parameter; and
 (G) storing the generated training data in one or more memories.

2. The non-transitory computer readable medium according to claim 1, wherein the AR device is a head-mounted display device having the run-time camera.

3. The non-transitory computer readable medium according to claim 1, wherein one camera functions as the run-time camera and the capture camera.

4. The non-transitory computer readable medium according to claim 1, wherein the capture camera is a component of a smartphone or tablet.

5. The non-transitory computer readable medium according to claim 4, wherein the one or more processors are a component of the smartphone or tablet.

6. The non-transitory computer readable medium according to claim 1, wherein the method further comprises:
 (H) selecting data representing a first view range that includes the first view angle, prior to step (D).

7. The non-transitory computer readable medium according to claim 1, where the method further comprises:
 (H) providing the generated training data to another processor connected to the run-time camera.

8. A non-transitory computer readable medium that embodies instructions that cause one or more processors to perform a method comprising:
 (A) specifying a 3D model, stored in one or more memories, corresponding to an object;
 (B) setting a run-time camera parameter for a run-time camera that is to be used in detecting a pose of the object in a real scene by acquiring, through a data communication port, the run-time camera parameter from an Augmented-Reality (AR) device having the run-time camera;
 (C) setting a capture camera parameter for a capture camera that is to be used in capturing an image frame containing a reference object;
 (D) acquiring, from the capture camera, the image frame of the reference object captured from a first view angle;
 (E) generating a 2D synthetic image by rendering the 3D model in a second view angle that is different from the first view angle;
 (F) generating training data using (i) the image frame, (ii) the 2D synthetic image, (iii) the run-time camera parameter, and (iv) the capture camera parameter; and
 (G) storing the generated training data in one or more memories.

9. The non-transitory computer readable medium according to claim 8, wherein the AR device is a head-mounted display device having the run-time camera.

10. The non-transitory computer readable medium according to claim 8, wherein one camera functions as the run-time camera and the capture camera.

11. The non-transitory computer readable medium according to claim 8, wherein the capture camera is a component of a smartphone or tablet.

12. The non-transitory computer readable medium according to claim 11, wherein the one or more processors are a component of the smartphone or tablet.

13. The non-transitory computer readable medium according to claim 8, wherein the method further comprises:
 (H) selecting data representing a first view range that includes the first view angle, prior to step (D).

14. The non-transitory computer readable medium according to claim 8, where the method further comprises:
 (H) providing the generated training data to another processor connected to the run-time camera.

15. A method of detecting an object in a real scene using a computer, the method comprising:
 (A) specifying a 3D model, stored in one or more memories, corresponding to the object, using a processor;
 (B) setting a run-time camera parameter for a run-time camera that is to be used in detecting a pose of the object in the real scene, using the processor, by:
  receiving, through a data communication port, information representing an Augmented-Reality (AR) device having the run-time camera; and
  acquiring, from one or more memories, the runtime camera parameter corresponding to the AR device in response to the information, a plurality of the run-time camera parameters and corresponding AR devices being associated with each other in one or more memories;
 (C) setting a capture camera parameter for a capture camera that is to be used in capturing an image frame containing a reference object, using the processor;
 (D) acquiring, from the capture camera, the image frame of the reference object captured from a first view angle, using the processor;
 (E) generating a 2D synthetic image by rendering the 3D model in a second view angle that is different from the first view angle, using the processor;
 (F) generating training data using (i) the image frame, (ii) the 2D synthetic image, (iii) the run-time camera parameter, and (iv) the capture camera parameter, using the processor; and
 (G) storing the generated training data in one or more memories, using the processor.

16. The method according to claim 15, wherein the AR device is a head-mounted display device having the run-time camera.

17. The method according to claim 15, wherein one camera functions as the run-time camera and the capture camera.

18. The method according to claim 15, wherein the capture camera is a component of a smartphone or tablet.

19. The method according to claim 18, wherein the processor is a component of the smartphone or tablet.

20. The method according to claim 15, further comprising:
 (H) selecting data representing a first view range that includes the first view angle, prior to step (D).

21. The method according to claim 15, further comprising:
 (H) providing the generated training data to another processor connected to the run-time camera.

22. A method of detecting an object in a real scene using a computer, the method comprising:
 (A) specifying a 3D model, stored in one or more memories, corresponding to the object, using a processor;
 (B) setting a run-time camera parameter for a run-time camera that is to be used in detecting a pose of the object in the real scene, using the processor by acquiring, through a data communication port, the run-time camera parameter from an Augmented-Reality (AR) device having the run-time camera;
 (C) setting a capture camera parameter for a capture camera that is to be used in capturing an image frame containing a reference object, using the processor;
 (D) acquiring, from the capture camera, the image frame of the reference object captured from a first view angle, using the processor;
 (E) generating a 2D synthetic image by rendering the 3D model in a second view angle that is different from the first view angle, using the processor;

(F) generating training data using (i) the image frame, (ii) the 2D synthetic image, (iii) the run-time camera parameter, and (iv) the capture camera parameter, using the processor; and
(G) storing the generated training data in one or more memories, using the processor.

* * * * *